Figure 1:
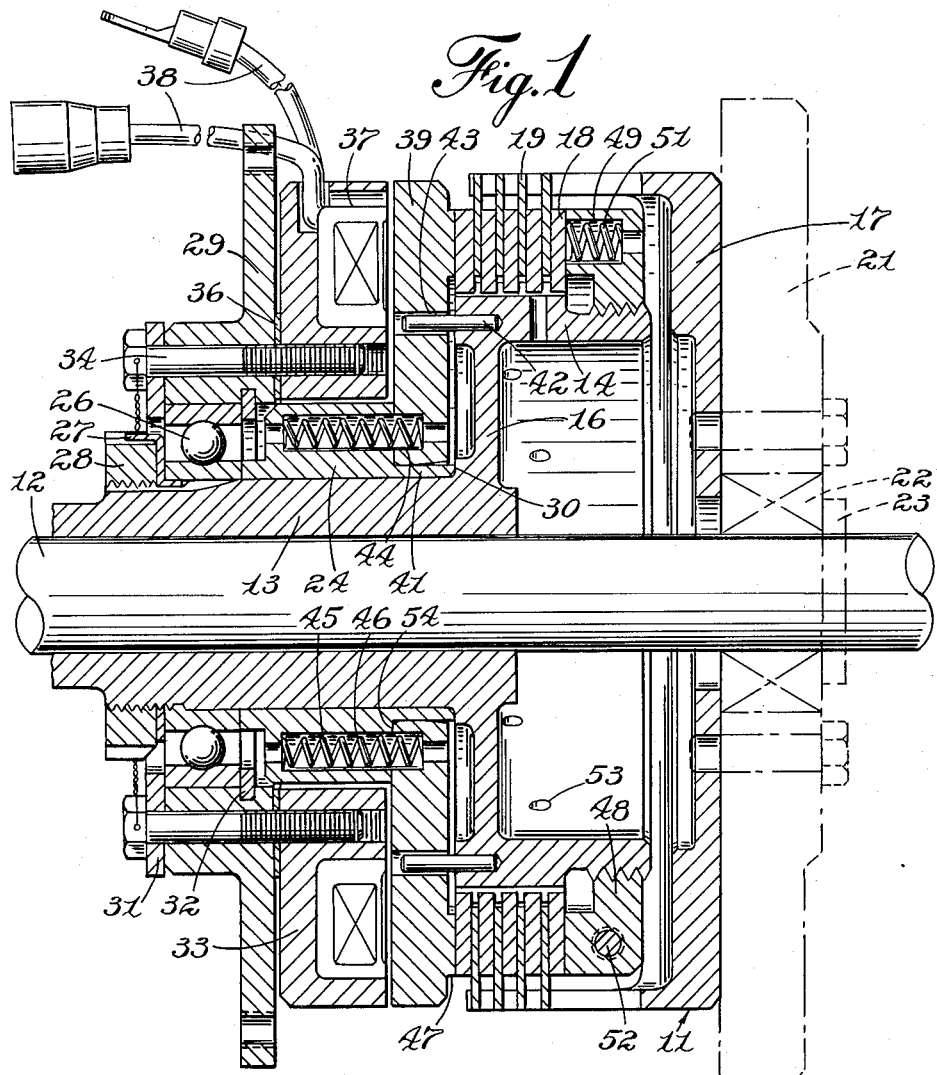

April 10, 1962    W. E. RUDISCH    3,028,737
COUPLE
Filed March 24, 1961

INVENTOR.
Walter E. Rudisch
BY
ATTORNEY

United States Patent Office 3,028,737
Patented Apr. 10, 1962

3,028,737
COUPLE
Walter Ernst Rudisch, Pine City, N.Y., assignor to The Bendix Corporation, Elmira Heights, N.Y., a corporation of Delaware
Filed Mar. 24, 1961, Ser. No. 98,115
22 Claims. (Cl. 64—30)

This invention relates to couplings, and more particularly to an electromagnetic couple for connecting a single speed input shaft to a driven device adapted to selectively drive the driven device at one of two output speeds.

Many coupling applications exist in which it is desirable that a single speed input source be coupled to a driven device with the couple being adapted to selectively drive the device at one of two output speeds. One such application is on heavy internal combustion engines where engine efficiency can be considerably improved by providing the engine with a two-speed fan drive. When a cold engine is started, there is no need to operate the fan at the speed calculated to obtain the maximum cooling effect simply because the engine coolant is cold and it is desirable that the coolant temperature be brought up to a desirable level. Thus the fan cooling functions initially are not fully required. Additionally, because of inherent characteristics, when a cold engine has been started, it is not immediately capable of producing its maximum rated output. If the fan output speed requirement at the time of cold engine operation is reduced to fifty percent of its design maximum by the use of a two-speed output coupling then the fan torque requirements imposed upon the cold engine will be reduced to twenty-five percent of the design maximum torque. Thus by reducing the fan speed during cold engine operation the torque loadings imposed by the fan on the engine will be materially reduced and will automatically compensate or offset the engine's initial inefficiencies making it possible to more efficiently and effectively utilize the available engine output under such circumstances.

Instances have been known where, after an engine had attained all operating levels of speed and coolant temperatures, the temperature of the surrounding atmosphere being drawn across the engine cooling system was undesirably low and it was desirable to operate the engine cooling fan at a speed less than its maximum design speed so as to reduce the cooling effect of the fan and thereby prevent overcooling of the coolant.

The attainment of these operating conditions by the use of prior art expedients is not practical nor economically feasible. To meet these goals it is desirable that a single coupling unit be used which can drive the fan at one of two output speeds but be driven from a single speed input source.

It is an object of this invention to provide a coupling which is facile, durable, efficient and economical to manufacture, fabricate and operate.

It is an object of this invention to provide a coupling for connecting a shaft having a single input speed to a driven device adapted to selectively drive the device at one of two output speeds.

It is another object of this invention to provide an electromagnetic couple which embodies continually frictionally engaged disc means between the driving and driven members thereof wherein the frictional engagement between the disc means can be varied to effect driving connections having different torque and/or speed transmitting capabilities.

It is still another object of the invention to provide an electromagnetic coupling having friction disc means maintained in continuous frictional engagement by spring means exerting a biasing force of sufficient magnitude to effect a driving connection of limited torque and/or speed transmitting capabilities and wherein the disc frictional engagement may be increased by other spring means operable upon the de-energizing of the electromagnet to create an increased biasing force capable of effecting a driving connection of relatively greater torque and/or speed transmitting capabilities.

It is a further object of the invention to provide an electromagnetic coupling wherein a driving connection between the driving and driven members possessing high torque and/or speed transmitting capabilities is effected by opposing biasing forces exerted on friction disc means and wherein the driving connection is reduced to relatively lower torque and/or speed transmitting capabilities by energizing the electromagnet so as to appreciably reduce the biasing forces exerted on the disc means.

It is a still further object of the invention to provide an electromagnetic coupling for connecting a single speed input source to a driven device adapted to selectively couple the driven device at one of two output speeds and wherein the couple is "fail safe" so that under conditions of failure it will always drive the driven device at the safe output speed.

Other objects and advantages of this invention will be apparent from the following description, the accompanying drawing and the appended claims.

Figure 2:
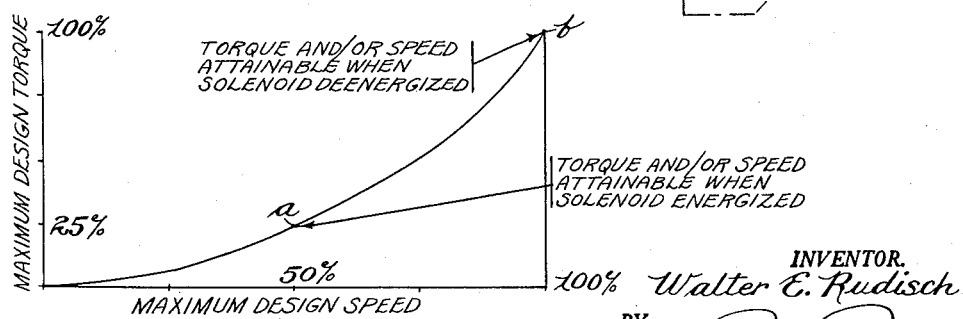

In the drawing:

FIGURE 1 is a side elevational view, in section, illustrating an electromagnetic coupling according to the present invention; and FIGURE 2 is a graphic illustration of the torque-speed curve characteristics obtainable with the present invention.

Referring to FIGURE 1 of the drawing, which illustrates a preferred embodiment of the present invention generally designated as 11, a driving shaft 12 extends from a suitable source of power (not shown). The driving shaft receives the driving member 13 which includes a radially offset annular portion 14 connected to the driving member by means of a flange portion 16.

The driving member is drivingly connected to the driven member or spider 17 through friction disc connecting means. The friction disc means which is made up of a plurality of inner discs 18 and outer discs 19 provides a continuous frictional connection between the driving and driven members. The inner discs 18 are mounted on the outer peripheral surface of the annular portion 14 and have a splined driving connection therewith providing for limited axial movement of the inner discs relative to the annular portion without any relative circumferential movement. The outer discs 19 are recessed along their outer edges to receive the circumferentially spaced axially extending fingers of the spider 17 thereby establishing a splined driving connection which provides for limited axial movement of the outer discs relative to the spider without any relative circumferential movement. Thus, the inner and outer discs are fixed on their respective members against any relative rotational movement but both are permitted a limited amount of axial movement so that the interengaging stack of discs can be tightened in varying degrees to form a continuously engaged frictional driving connection between the member 13 and 17.

The spider can be connected to a driven device here illustrated as a gear 21. The gear is journalled on a bearing 22 retained in proper axial alignment between a retainer ring 23 and a face portion of the spider 17.

Mounted on the driving member 13 is a spacer sleeve 24 which is held in axial position on the driving member between the inner race of the ball bearing 26 and a shoulder 30 formed in the flange 16. A key washer 27 and a spanner nut 28 threadedly received on the member 13 maintain the ball bearing inner race in position.

The outer race of the ball bearing 26 supports the stationary bearing housing 29 which is anchored in any convenient manner. A retainer bearing 31 and a retainer ring 32 axially position and confine the outer race of the ball bearing 26 relative to the bearing housing. A magnet body 33 is supported on the bearing housing 29 by means of a plurality of cap screws 34 in radial spaced relation from the spacer sleeve 24. Shims 36, as required, are inserted between the housing 29 and the magnet body 33.

An annular energizing coil or electromagnet 37 is supported in the magnet body by means of an epoxy resin or similar thermosetting compound. Terminal leads 38 extend outwardly from the coil for a connection to an externally controlled source of energizing power. The unsupported radial face of the magnet body provides the pole faces for the magnet field when the coil is energized.

An armature plate 39 has its inner edge slidably supported on the reduced portion 41 of the spacer sleeve 24 and is limited in its axial movements by the unsupported pole faces of the magnet body 33 and an edge portion of the driving member's annular portion 14. A plurality of dowel pins 42 seated in the annular portion extend axially into complementing wells 43 in the armature plate to provide support and guidance for the plate during its axial movements. Adjacent the inner edge of the armature plate there is provided a plurality of circumferentially spaced wells 44 which are aligned circumferentially and radially with a like plurality of relatively deeper wells 46 formed in the spacer sleeve 24. An open coil compression spring 45 is positioned one in each of the wells 46 and extends into the complementing wells 44 of the armature plate to normally exert a biasing force tending to urge the armature plate away from the magnet body pole faces in an axial direction towards the friction discs. The armature plate is further provided with an annular rim 47 adjacent its outer marginal portions on the radial face opposite the friction discs. The rim is adapted to engage the adjacent endmost friction disc to compress the friction discs 18 and 19 or to limit the axial movement of the friction discs.

Axial movement of the discs 18 and 19 away from the magnet body, due to the compressive force exerted by the armature plate and springs 45, is limited by a lock nut assembly 48 threadedly received on the free extremity of the annular portion 14 of the driving member 13. A plurality of wells 49 are provided in the radial face of the lock nut adjacent the other outermost friction disc. A like plurality of open coil compression springs 51 are reposed one in each well 49 and have one end thereof in continuous compressive engagement with the endmost friction disc. A substantially tangentially mounted machine screw 52 engages portions of the lock nut 48 to secure it to the driving member against axial displacement once proper positional relationships have been established. The lock nut further limits the axial displacement of the friction discs when they are biased by the armature plate and springs 45, and provides means for adjusting for disc wear when and if it occurs.

In operation, when the coil 37 is energized, the armature plate 39 is attracted toward the pole faces of the magnet body 33 and slides or pivots to that position on the reduced diameter portion 41 of the spacer sleeve 24. The dowel pins 42 seated in the driving member's annular portion 14 assist in obtaining proper axial movement of the armature plate. The attraction of the armature plate causes the springs 45 reposed in the wells 44 and 46 in the armature plate and spacer sleeve, respectively, to be compressed thus removing that biasing force from being exerted on the friction discs. Concomitantly, the springs 51 in the lock nut 48 bias the friction discs into compressive engagement against the rim portion 47 of the retracted armature plate. It will be noted that the axial separation between the retracted armature plate rim 47 and the edge of the annular portion 14 is less than the thickness of the end disc. The shims 36 between the magnet body 33 and the supporting bearing housing 29 can be used to ensure proper spacing. Rotation of the driving shaft 12 will be transmitted to the driving member 13 and thence to the driven member or spider 17 through the driving connection established by the friction discs 18 and 19. The compressive force exerted by the springs 51 will maintain the friction discs in compressive engagement but these springs will assert an insufficient biasing force to prevent slippage. Accordingly, the torque and/or speed transmitting capabilities of the couple when the armature 39 is retracted is reduced or diminished and the torque and/or speed requirements of the driven device will not be wholly met. In FIGURE 2, the graphic illustration of the torque-speed curve characteristics indicates that if the speed is reduced to fifty percent of the maximum design speed to a point $a$ on the curve, then the torque will automatically be reduced to twenty-five percent of the maximum design torque value.

When the coil 37 is de-energized, the springs 45 will urge the armature plate 39 axially away from the magnet body pole faces and cause the rim 47 thereof to compressively engage the adjacent friction disc. The combined compressive force of the springs 45 and 51, or the force of the springs 45 and the axial resistance of the lock nut 48 will be of sufficient magnitude to cause the friction discs to effect a driving connection between the driving and driven members capable of transmitting a greater torque and/or speed to the driven device. Under normal circumstances this relatively greater frictional driving connection will cause the driven device and the driving member to rotate at the same speed. Point $b$ in the graphic illustration of FIGURE 2 illustrates the torque-speed curve characteristics when the coil 33 is de-energized and the biasing effect of springs 45 is utilized.

The present invention can be operated either in air or in an oil bath. Since the friction discs 18 and 19 are in continuous frictional engagement, the latter type of operation is preferred. Also, because the friction discs are in continuous engagement, it is desirable that the radial surfaces of the discs be provided with radial and tangential grooves (not shown) to allow circulating fluids to act as coolants to dissipate any heat, and particularly the heat generated during periods when less than maximum torque and/or speed is transmitted. To provide for the free circulation of the coolant fluids, the annular portion 14 of the driven member 13 is provided with a plurality of radial passages 53 axially offset or staggered which provided flow paths for the circulation of the coolants.

A desirable feature of the present invention is, according to present construction, that no engagement between cooperating elements which rotate relative to one another exists. The spacer sleeve 24 is provided with a shoulder 54 which limits the axial movement of the armature plate 39 toward the magnet body 33 and prevents physical contact between the radial face of the armature plate 39 and the pole faces on the unsupported radial face of the magnet body. The disc pack is so arranged that the endmost friction discs are inner discs 18 supported by the driven member and, consequently, when the biasing forces are exerted by the armature plate and/or the compression spring 51, there is no relative movement between the discs and the plate and/or the springs 51.

It can be appreciated that should the energizing power supply to the coil 37 be interrupted, the electromagnetic field generated by the coil will cease to exist and the armature plate will then assume the illustrated position by reason of the axial force exerted by the springs 45 and will thereby ensure a complete safe transmittal of power to the driven device. This "fail safe" characteristic is of extreme importance in the heavy internal combustion engine applications hereinbefore described.

While the form of the apparatus herein described constitutes a preferred embodiment of the invention, it is to be understood that this invention is not limited to the exact form of this apparatus and that changes may be

I claim:

1. A variable speed couple for connecting a rotating shaft to a driven device adapted to selectively couple the driven device to the shaft at a first speed and at a second speed comprising: a driving member adapted for connection to the rotating shaft; a driven member adapted for connection to the driven device; interfitting friction disc means on said driving and driven members; a magnet body including controllable magnet means for creating a magnetic field; an armature plate located between the magnet body and the friction disc means adapted for axial movement toward the magnet body upon creation of the magnetic field; means including a biasing member located on the opposite side of the friction disc means from said armature for compressing said friction discs to effect the first speed connection between the driving and driven members; and, means including resiliently yieldable means for biasing the armature into compressive engagement with the friction discs upon suppression of the magnetic field to effect the second speed connection between the driving and driven members.

2. A variable speed couple for connecting a rotating shaft to a driven device adapted to selectively couple the driven device to the shaft at a first speed and at a second relatively higher speed comprising: the driving member adapted for connection to the rotating shaft; a driven member adapted for connection to the driven device; interfitting friction disc means on said driving and driven members; a stationary magnet body including controllable magnet means for creating a magnetic field; an armature plate supported on the driving member located between the magnet body and the friction disc means adapted for axial movement toward the magnet body upon creation of the magnetic field; means including a biasing member supported on the driving member located on the opposite side of the friction disc means from said armature for compressing said friction discs against the armature to effect the first speed connection between the driving and driven members; and, means supported on the driving member including resiliently yieldable means for biasing the armature into compressive engagement with the friction discs upon suppression of the magnetic field to effect the second relatively higher speed connection between the driving and driven members.

3. A variable speed couple for connecting a rotating shaft to a driven device adapted to selectively couple the driven device to the shaft at a first speed and at a second speed comprising: a driving member adapted for connection to the rotating shaft; a driven member adapted for connection to the driven device; interfitting friction disc means on said driving and driven members; a magnet body including an electromagnet for creating an electromagnetic field; armature plate located between the magnet body and the friction disc means adapted for axial movement toward the magnet body upon energizing the electromagnet; means including a biasing member located on the opposite side of the friction disc means from said armature for compressing said friction discs to effect the first speed connection between the driving and driven members; and, means including resiliently yieldable means for biasing the armature into compressive engagement with the friction discs upon de-energizing the electromagnetic field to effect the second speed connection between the driving and driven members.

4. A variable speed couple for connecting a rotating shaft to a driven device adapted to selectively couple the driven device to the shaft at a first speed and at a second relatively higher speed comprising: a driving member adapted for connection to the rotating shaft; a driven member adapted for connection to the driven device; interfitting friction disc means on said driving and driven members; a stationary magnet body including an electromagnet for creating an electromagnetic field; an armature plate supported on the driving member located between the magnet body and the friction disc means adapted for axial movement towards the magnet body upon energizing the electromagnet; means including a biasing member supported on the driving member located on the opposite side of the friction disc means from said armature for compressing said friction discs against the armature to effect the first speed connection between the driving and driven members; and, means supported on the driving member including resiliently yieldable means for biasing the armature into compressive engagement with the friction discs upon de-energizing the electromagnet to effect the second relatively higher speed connection between the driving and driven members.

5. A variable torque transmitting couple for connecting a single speed rotating shaft to a driven device adapted to selectively transmit a first torque and a second torque to the driven device comprising: a driving member adapted for connection to the rotating shaft; a driven member adapted for connection to the driven device; interfitting friction disc means on the driving and driven members; a magnet body including an electromagnet for creating an electromagnetic field; an armature plate located between the magnet body and the friction disc means adapted for axial movement toward said magnet body upon energizing the electromagnet; means including a biasing member located on the opposite side of the friction disc means from the armature for compressing the discs to effect a driving connection of said first torque transmitting capabilities between the driving and driven members; and, means including resiliently yieldable means for biasing the armature into compressive engagement with the disc means upon de-energizing the electromagnet to effect a driving connection of said second torque transmitting capabilities between the driving and driven members.

6. A variable torque transmitting couple for connecting a single speed rotating shaft to a driven device adapted to selectively transmit a first low torque and a second relatively higher torque to the driven device comprising: a drive member adapted for connection to the rotating shaft; a driven member adapted for connection to the driven device; interfitting friction disc means on the driving and driven members; a stationary magnet body including an electromagnet for creating an electromagnetic field; an armature plate supported on the driving member located between the magnet body and the friction disc means adapted for axial movement toward said magnet body upon energizing the electromagnet; means including a biasing member supported on the driving member located on the opposite side of the friction disc means from the armature for compressing the discs against the armature to effect a driving connection of said first low torque transmitting capabilities between the driving and driven members; and, means supported on the driving member including resiliently yieldable means for biasing the armature into compressive engagement with the disc means upon de-energizing the electromagnet to effect a driving connection of said second relatively higher torque transmitting capabilities between the driving and driven members.

7. A variable torque transmitting couple for connecting a single speed rotating shaft to a driven device adapted to selectively transmit a first torque and a second torque to the driven device comprising: a driving member adapted for connection to the rotating shaft; a driven member adapted for connection to the driven device; interfitting friction disc means on the driving and driven members; a magnet body including controllable magnet means for creating an electromagnetic field; an armature plate located between the magnet body and the friction disc means adapted for axial movement toward said magnet body upon creation of the magnetic field; means including a biasing member located on the opposite side of the friction disc means from the armature for compressing the discs to effect a driving connection of said first torque transmitting capabilities between the driving and driven members; and, means including resiliently yieldable means for biasing the armature into compressive engagement with the friction disc means upon suppression of the magnetic field to effect a driving connection of said second torque transmitting capabilities between the driving and driven members.

8. A variable torque transmitting couple for connecting a single speed rotating shaft to a driven device adapted to selectively transmit a first low torque and a second relatively higher torque to the driven device comprising: a driving member adapted for connection to the rotating shaft; a driven member adapted for connection to the driven device; interfitting friction disc means on the driving and driven members; a stationary magnet body including controllable magnet means for creating a magnetic field; an armature plate supported on the driving member located between the magnet body and the friction disc means adapted for axial movement toward said magnet body upon creation of the magnetic field; means including a biasing member supported on the driving member located on the opposite side of the friction disc means from the armature for compressing the discs against the armature to effect a driving connection of said first low torque transmitting capabilities between the driving and driven members; and, means supported on the driving member including resiliently yieldable means for biasing the armature into compressive engagement with the disc means upon suppression of the magnetic field to effect a driving connection of said second relatively higher torque transmitting capabilities between the driving and driven members.

9. A variable speed coupling for connecting a rotating shaft to a driven device adapted to selectively transmit a first speed and a second speed to the driven device including a driving member adapted for connection to the rotating shaft, a driven member adapted for connection to the driven device, interfitting friction disc means on the driving and driven members said friction discs being continuously frictionally engaged for effecting the transmission of one of said speeds, and means for varying the degree of disc frictional engagement comprising: stop means located on one side of the friction disc means; means including a biasing member located on the opposite side of the friction disc means from the stop member for compressing the friction disc against the stop means to effect said first speed connection between the driving and driven members; a magnet body including controllable magnet means for creating a magnetic field; an armature plate located between said one side of the friction disc means and the magnet body adapted for axial movement toward the magnet body upon creation of the magnetic field; and, means supported on the driving member including resiliently yieldable means for biasing the armature into engagement with the friction discs to compress the friction disc means between the armature and the means for effecting said first speed connection upon suppression of the magnetic field to effect said second speed connection between the driving and driven members.

10. A variable coupling as set forth in claim 9 in which the armature plate provides the stop means located on the said one side of the friction disc means.

11. A variable speed coupling for connecting a rotating shaft to a driven device adapted to selectively transmit a first speed and a second relatively higher speed to the driven device including a driving member adapted for connection to the rotating shaft, a driven member adapted for connection to the driven device, interfitting friction disc means on the driving and driven members said friction discs being continually frictionally engaged for effecting the transmission of one of said speeds, and means for varying the degree of disc frictional engagement comprising: stop means located on one side of the friction disc means; means supported on the driving member including a biasing member located on the opposite side of the friction disc means from the stop member for compressing the friction discs against the stop means to effect said first speed connection between the driving and driven members; a stationary magnet body including controllable magnet means for creating a magnetic field; an armature plate supported on the driving member located between said one side of the friction disc means and the magnet body adapted for axial movement toward the magnet body upon creation of the magnetic field; and, means supported on the driving member including resiliently yieldable means for biasing the armature into engagement with the friction discs to compress the friction disc means between the armature and the means for effecting said first speed connection upon suppression of the magnetic field to effect said second relatively higher speed connection between the driving and driven members.

12. A variable speed coupling for connecting a rotating shaft to a driven device adapted to selectively transmit a first speed and a second speed to the driven device including a driving member adapted for connection to the rotating shaft, a driven member adapted for connection to the driven device, interfitting friction disc means on the driving and driven members said friction discs being continually frictionally engaged for effecting the transmission of one of said speeds, and means for varying the degree of disc frictional engagement comprising: stop means located on one side of the friction disc means; means including a biasing member located on the opposite side of the friction disc means from the stop member for compressing the friction disc against the stop means to effect said first speed connection between the driving and driven members; a magnet body including an electromagnet for creating an electromagnetic field; an armature plate located between said one side of the friction disc means and the magnet body adapted for axial movement toward the magnet body upon energizing the electromagnet; and, means including resiliently yieldable means for biasing the armature into engagement with the friction discs to compress the friction disc means between the armature and the means for effecting said first speed connection upon de-energizing the electromagnet to effect said second speed connection between the driving and driven members.

13. A variable coupling as set forth in claim 12 in which the armature plate provides the stop means located on said one side of the friction disc means.

14. A variable speed coupling for connecting a rotating shaft to a driven device adapted to selectively transmit a first speed and a second relatively higher speed to the driven device including a driving member adapted for connection to the rotating shaft, a driven member adapted for connection to the driven device, interfitting driven disc means on the driving and driven member said friction discs being continually frictionally engaged for effecting the transmission of one of said speeds, and means for varying the degree of disc frictional engagement comprising: stop means located on one side between the friction disc means; means supported on the driving member including a biasing member located on the opposite side of the friction disc means from the stop member for compressing the friction discs against the stop means to effect said first speed connection between the driving and driven members; a stationary magnet body including an electromagnet for creating an electromagnetic field; an armature plate supported on the driving member located between said friction means and the magnet body adapted for axial movement toward the magnet body upon energizing the electromagnet; and, means supported on the driving member including resiliently yieldable means for biasing the armature into engagement with the friction discs to compress the friction disc means between the armature and friction discs for effecting first speed connection upon de-energizing the electromagnet to effect said second relatively higher speed connection between the driving and driven members.

15. A variable torque transmitting couple for connecting a single speed rotating shaft to a driven device adapted to selectively transmit to the driven device a first torque and a second torque including a driving member adapted for connection to the rotating shaft, a driven member adapted for connection to the driven device, interfitting friction disc means on the driving and driven members said friction discs being continually frictionally engaged for effecting the transmission of said torque, and means for varying the degree of disc frictional engagement comprising: stop means located on one side of the friction disc means; means including a baising member located on the opposite side of the friction disc means from the stop member for compressing the friction discs against the stop means to effect said first torque transmitting connection between the driving and driven members; a magnet body including an electromagnet for creating an electromagnetic field; an armature plate located between said one side of the friction disc means and the magnet body adapted for axial movement toward the magnet body upon energizing the electromagnet; and, means including resiliently yieldable means for biasing the armature into engagement with the friction discs to compress the friction disc means between the armature and the means for effecting said first torque transmitting connection upon de-energizing the electromagnet to effect said second torque transmitting connection between the driving and driven members.

16. A variable torque transmitting coupling as set forth in claim 15 in which the armature plate provides the stop means located on said one side of the friction disc means.

17. A variable torque transmitting couple for connecting a single speed rotating shaft to a driven device adapted to selectively transmit to the driven device a first low torque and a second relatively higher torque including a driving member adapted for connection to the rotating shaft, a driven member adapted for connection to the driven device, interfitting friction disc means on the driving and driven members said friction discs being continually frictionally engaged for effecting the transmission of said torques, and means for varying the degree of disc frictional engagement comprising: stop means located on one side of the friction disc means; means supported on the driving member including a biasing member located on the opposite side of the friction disc means from the stop member for compressing the friction discs against the stop means to effect said first low torque transmitting connection between the driving and driven members; a stationary magnet body including an electromagnet for creating an electromagnetic field; an armature plate supported on the driving member located between said one side of the friction disc means and the magnet body adapted for axial movement toward the magnet body upon energizing the electromagnet; and, means supported on the driving member including resiliently yieldable means for biasing the armature into engagement with the friction discs to compress the friction discs between the armature and the means for effecting said first torque transmitting connection upon de-energizing the electromagnet to effect said second relatively higher torque transmitting connection between the driving and driven members.

18. A variable torque transmitting couple for connecting a single speed rotating shaft to a driven device adapted to selectively transmit to the driven device a first torque and a second torque including a driving member adapted for connection to the rotating shaft; a driven member adapted for connection to the driven device; interfitting friction disc means on the driving and driven members, said friction discs being continually frictionally engaged for effecting the transmission of said torques, and means for varying the degree of disc frictional engagement comprising: stop means limited on one side of the friction disc means; means including a biasing member located on the opposite side of the friction disc means from the stop member for compressing the friction discs against the stop means to effect said first torque transmitting connection between the driving and driven members; a magnet body including controllable magnet means for creating a magnetic field; an armature plate located between said one side of the friction disc means and the magnet body adapted for axial movement toward the magnet body upon creation of the magnetic field; and, means including resiliently yieldable means for biasing the armature into engagement with the friction discs to effect compression of the friction disc means between the armature and the means for effecting said first torque transmitting connection upon suppression of the magnetic field to effect said second torque transmitting connection between the driving and driven members.

19. A variable torque transmitting coupling as set forth in claim 18 in which the armature plate provides the stop means located on said one side of the friction disc means.

20. A variable torque transmitting couple for connecting a single speed rotating shaft to a driven device adapted to selectively transmit to the driven device a first low torque and a second relatively higher torque including a driving member adapted for connection to the rotating shaft, a driven member adapted for connection to the driven device, interfitting friction disc means on the driving and driven members said friction discs being continually frictionally engaged for effecting the transmission of said torques, and means for varying the degree of disc frictional engagement comprising: stop means located on one side of the friction disc means; means supported on the driving member including a biasing member located on the opposite side of the friction disc means from the stop member for compressing the friction discs against the stop means to effect said first low torque transmitting connection between the driving and driven members; a stationary magnet body including controllable magnet means for creating a magnetic field; an armature plate supported on the driving member located between said one side of the friction disc means and the magnet body adapted for axial movement toward the magnet body upon creation of the magnetic field; and, means supported on the driving member including resiliently yieldable means for biasing the armature into engagement with the friction discs to compress the friction disc means between the armature and the means for effecting first said torque transmitting connection upon suppression of the magnetic field to effect said second relatively higher torque transmitting connection between the driving and driven members.

21. A couple for connecting a single speed rotating shaft to a driven device adapted to selectively drive the driven device at one of two output speeds including a driving member adapted for connection to the shaft, a driven member adapted for connection to the driven device, intercalated friction discs alternately supported by the driving and driven members said discs being continually frictionally engaged to effect a driving connection at one of said two output speeds, and means for varying the degree of disc frictional engagement comprising: a magnet body including an electromagnetic field; an armature plate supported on the driving member located between the magnet body and one side of the friction disc means adapted for axial movement toward the magnet body upon energization of the electromagnet; a first spring support member mounted on the driving member located on the opposite side of the friction disc means from the armature plate; a plurality of springs carried by said first support member having the end of each spring continually engaging the adjacent endmost disc biasing the disc means against the armature plate and adapted to exert a force creating a sufficient degree of frictional engagement between the discs to effect a driving connection of limited speed transmitting capabilities between the driving and driven members; a second spring support member mounted on the driving member located on said one side of the friction disc means; a plurality of springs carried by said second support member having the end of each spring continually engaging the armature plate adapted when the electromagnet is de-energized to urge the armature plate into compressing engagement with the friction disc means whereby the armature compresses the friction discs with a force creating a relatively greater frictional engagement between the discs to effect a driving connection of relatively greater speed transmitting capabilities between the driving and driven members.

22. A coupling comprising: driving and driven members interconnected by friction discs; an electromagnet; an armature adapted to be attracted upon energization of said electromagnet away from engagement with said friction discs; means including spring members for compressing the discs upon energization of the electromagnet to effect a first coupled connection between the driving and driven members; means including resiliently yieldable means for biasing the armature into engagement with said friction discs upon deenergization of the electromagnet to effect a second couple connection between the driving and driven members, said second couple connection having greater torque and speed transmitting capabilities than said first couple connection.

References Cited in the file of this patent

UNITED STATES PATENTS

| | | |
|---|---|---|
| 828,647 | Gibbs | Aug. 14, 1908 |
| 2,214,901 | Griffin | Sept. 17, 1940 |
| 2,530,180 | Russell | Nov. 14, 1950 |
| 2,664,981 | D'Ozouville | Jan. 5, 1954 |
| 2,729,310 | Le Tourneau | Jan. 3, 1956 |